US010479256B2

(12) United States Patent
Rezvanian (10) Patent No.: US 10,479,256 B2
(45) Date of Patent: Nov. 19, 2019

(54) SYSTEM AND METHOD FOR LOADING A CONTAINER FOR TRANSPORT

(71) Applicant: 2222035 Ontario Inc., Toronto (CA)

(72) Inventor: Cyrus Rezvanian, Richmond Hill (CA)

(*) Notice: Subject to any disclaimer, the term of this patent is extended or adjusted under 35 U.S.C. 154(b) by 0 days.

(21) Appl. No.: 15/448,706

(22) Filed: Mar. 3, 2017

(65) Prior Publication Data
US 2017/0253166 A1 Sep. 7, 2017

Related U.S. Application Data

(60) Provisional application No. 62/302,865, filed on Mar. 3, 2016.

(51) Int. Cl.
*B60P 1/64* (2006.01)
*B60P 1/02* (2006.01)

(52) U.S. Cl.
CPC ............ *B60P 1/6445* (2013.01); *B60P 1/027* (2013.01); *B60P 1/6427* (2013.01)

(58) Field of Classification Search
CPC .......... B60P 1/025; B60P 1/027; B60P 1/6445
USPC ............................. 414/458; 296/26.12, 26.13
See application file for complete search history.

(56) References Cited

U.S. PATENT DOCUMENTS

| | | | | | |
|---|---|---|---|---|---|
| 3,521,773 A | * | 7/1970 | Geister | ................. | B60P 1/6427 254/45 |
| 3,707,238 A | * | 12/1972 | Thibodeau, Sr. | ....... | B60P 1/025 414/458 |
| 3,967,743 A | * | 7/1976 | Yoder | ........................ | B60P 3/40 280/638 |
| 4,049,143 A | * | 9/1977 | Hatakka | ..................... | B60P 1/34 280/656 |
| 4,061,359 A | * | 12/1977 | Metcalfe | ............... | B60P 1/6445 280/638 |
| 4,120,413 A | * | 10/1978 | Harris | .................... | B60P 1/6445 414/460 |
| 4,122,963 A | * | 10/1978 | Berglund | .................. | B60P 1/18 414/471 |
| 4,155,471 A | * | 5/1979 | Yancy | ..................... | B60P 1/025 414/420 |
| 4,511,303 A | * | 4/1985 | O'Neill | ................... | B60P 1/025 414/458 |
| 4,619,578 A | * | 10/1986 | Routledge | ................ | B60G 3/14 180/41 |

(Continued)

FOREIGN PATENT DOCUMENTS

CA 2745785 A1 5/2010
CA 2941300 A1 5/2010

*Primary Examiner* — James Keenan
(74) *Attorney, Agent, or Firm* — Elan IP Inc.

(57) ABSTRACT

Systems and methods for loading a container onto a container carrier comprising, lowering a set of rails of the container carrier from a raised position to a lowered position, wherein a horizontal surface of each of the set of rails is lower than the bottom surface of the container, expanding, horizontally, the set of rails, to an expanded position, moving at least one of the container carrier or the container so that the container is between the set of rails, contracting, horizontally, the set of rails, to a contracted position, such that the horizontal surface of each of the set of rails is directly underneath the bottom surface of the container and raising the set of rails from the lowered position to the raised position, such that the horizontal surface of each of the set of rails lift the container off the supports.

18 Claims, 7 Drawing Sheets

(56) References Cited

U.S. PATENT DOCUMENTS

| | | | | |
|---|---|---|---|---|
| 4,699,558 A | * | 10/1987 | Hagge | B60P 1/027 254/2 R |
| 5,018,930 A | * | 5/1991 | Hardin | B62B 5/0083 254/8 R |
| 6,155,770 A | * | 12/2000 | Warhurst | B60P 1/6445 414/347 |
| 6,821,066 B2 | * | 11/2004 | Wehrli | B60P 3/40 410/32 |
| 6,910,844 B2 | * | 6/2005 | Trescott | B60P 1/027 180/209 |
| 7,371,038 B2 | * | 5/2008 | Tuvim | B60P 1/025 414/459 |
| 7,866,933 B2 | * | 1/2011 | Welch | B60P 1/6445 414/458 |
| 8,182,193 B2 | | 5/2012 | Gaudet et al. | |
| 8,646,753 B2 | * | 2/2014 | Ross | B60P 1/6445 254/2 R |
| 2008/0253872 A1 | * | 10/2008 | Tollefson | B60P 1/025 414/458 |

\* cited by examiner

SYSTEM AND METHOD FOR LOADING A CONTAINER FOR TRANSPORT

TECHNICAL FIELD

The invention relates generally to transporting storage/shipping containers. More specifically it relates to loading a storage container onto a mobile transport unit while maintaining a horizontal orientation.

BACKGROUND

Portable storage containers are ubiquitous. Containers are used to ship goods by truck, rail, and boat. Current methods to load containers for shipment by truck involve raising one side of the container so that it may be moved up a ramp on an angle. Other methods involve the use of cranes and forklifts which can also result in a container tilting. When one side of the container is raised, the goods inside the container can shift and become damaged. It is desirable that the container remain as level as possible during all phases of shipping so as to minimize movement of the goods inside.

As such, improvements to address such problems are desirable.

SUMMARY OF THE INVENTION

There is a mobile carrier unit for loading a container, the container positioned behind the mobile carrier unit and resting on supports that raise a bottom surface of the container off the ground and the supports being positioned such that at least a portion of the longitudinal edges of the bottom surface of the container does not have supports thereunder, the mobile carrier unit may comprise: a mast, attachable to an operator area; a carriage, connected to and vertically displaceable relative to the mast and connected to a first horizontal actuator; a pair of rails, each attached to and extending longitudinally from the first horizontal actuator, and being parallel to each other, each rail comprising a horizontal surface and at least one rear wheel moveably attached thereto supporting the rail that rolls along the ground when the container carrier moves longitudinally; a forward vertical actuator, disposed between the mast and the carriage, that raises and lowers the carriage, a first horizontal actuator, connected to the carriage and each of the pair of rails, that expands and contracts laterally, moving the pair of rails between a contracted position, wherein the horizontal surface of each of the pair of rails is underneath the bottom surface of the container when the container is between the two rails and an expanded position, wherein the pair of rails are wider than the container; and a pair of rear vertical actuators, one on each rail, operably connected to the rails and the rear wheel, that expand and contract to raise and lower the rear wheel; wherein the forward vertical actuator and the pair of rear vertical actuators are configured to: lower the first rail and the second rail from a raised position, wherein the rear wheel on each rail is on the ground, permitting the rails to move longitudinally, to a lowered position, wherein the rear wheel on each rail of the pair of rails is off the ground and the horizontal surface of each of the pair of rails is lower than the bottom surface of the container; and raise the pair of rails from the lowered position to the raised position.

The first horizontal actuator may expand and contract when the pair of rails are in the lowered position.

Each of the pair of rails may further comprise at least one lateral wheel that is off the ground in the raised position and on the ground in the lowered position, the lateral wheel rolling laterally along the ground when the first horizontal actuator causes the two rails to move laterally.

In the expanded position the pair of rails may be 7-7.5 feet apart and in the contracted position the pair of rails may be 8-9 feet apart.

Each of the pair of rails may further comprise a longitudinal vertical surface and in the contracted position, each longitudinal vertical surface may extend above the bottom surface of the container.

The mobile carrier unit may further comprise a cover, extending laterally between the pair of rails at the longitudinal end of the mobile carrier unit behind the back of the container when the container is on the pair of rails, the cover connected to a first rail of the pair of rails and removably connected to the second rail of the pair of rails.

The mobile carrier unit may further comprise controls that operate the horizontal actuators and the vertical actuators and the controls are located in the operator area.

The mast may be integral to the operator area and the operator area may be a commercial truck cab.

There is further a system for loading a container on a mobile carrier unit, the container positioned behind the mobile carrier unit and resting on supports that raise a bottom surface of the container slightly off the ground and the supports being positioned such that at least a portion of the longitudinal edges of the bottom surface of the container does not have supports thereunder, the system may comprise: the mobile carrier unit having a lowered position configuration wherein the rear wheel on each rail of a pair of rails is off the ground and the horizontal surface of each of the set of rails is lower than the bottom surface of the container and the mobile carrier comprises a pair of rails, each attached to and extending longitudinally from a first horizontal actuator, and being parallel to each other, the pair of rails comprise a horizontal surface and at least one rear wheel moveably attached thereto supporting the rail that rolls along the ground when the container carrier moves longitudinally; the mobile carrier unit having a raised position configuration wherein the rear wheel on each rail is on the ground, permitting the rails to move longitudinally; the mobile carrier unit having an expanded position configuration wherein the pair of rails are wider than the container; the mobile carrier unit having a contracted position configuration wherein the horizontal surface of each of the pair of rails is underneath the bottom surface of the container when the container is between the pair of rails; the mobile carrier unit further comprising: a first horizontal actuator, operably connected to an operator area and each of the pair of rails, wherein the first horizontal actuator expands and contracts laterally, moving the pair of rails between the contracted position and the expanded position; a forward vertical actuator, operably connected to the operator area and the pair of rails, that raises and lowers the carriage, and a pair of rear vertical actuators, one on each rail, operably connected to the rails and the rear wheel, that expand and contract to raise and lower the rear wheel, wherein the forward vertical actuator and the pair of rear vertical actuators expand and contract to move the mobile carrier between the raised position and the lowered position.

The first horizontal actuator may expand and contract when the pair of rails are in the lowered position configuration.

Each of the pair of rails may further comprise at least one lateral wheel that is off the ground in the raised position configuration and on the ground in the lowered position configuration, the lateral wheel rolling laterally along the ground when the first horizontal actuator causes the pair of rails to move laterally.

In the expanded position configuration the pair of rails may be 7-7.5 feet apart and in the contracted position the pair of rails may be 8-9 feet apart.

Each of the pair of rails may further comprise a longitudinal vertical surface and in the contracted position configuration, each longitudinal vertical surface may extend above the bottom surface of the container.

The system may further comprise a cover, extending laterally between the pair of rails at the longitudinal end of the mobile carrier unit behind the back of the container when the container is on the pair of rails, the cover connected to a first rail of the pair of rails and removably connected to the second rail of the pair of rails.

The system may further comprise controls that operate the horizontal actuators and the vertical actuators and the controls are located in the operator area.

The mast may be integral to the operator area and the operator area is a commercial truck cab.

In another embodiment of the present invention there is a mobile carrier unit for transporting a storage container comprising, an operator area comprising controls, and a storage container carrier, attached to the operator area, the storage container carrier comprising a pair of lateral members connected to a pair of longitudinal members, the pair of longitudinal members configured for a storage container to be disposed thereon and restrict movements of the storage container in multiple axes when the longitudinal members are in a contracted state, a first set of horizontal actuators and a first set of vertical actuators, the first set of vertical actuators being configured to move the lateral and longitudinal members from a lowered state to a raised state and the first set of horizontal actuators being configured to move the lateral members from a contracted state to an extended state and allow the longitudinal members to surround the storage container when in the extended state, a rear assembly further comprising a set of rear wheels and a second set of vertical actuators, the second set of vertical actuators configured to raise and lower the set of rear wheels between a wheels lowered state and a wheels raised state, lateral wheels, in contact with the ground and enabling extension and contraction of the lateral members between the contracted state and extended state when the storage container carrier is in a lowered state and the wheels are in the wheels raised state.

In yet another embodiment of the present invention there is a method for loading a storage container onto a mobile carrier unit comprising: unsecuring a rear assembly of a storage container carrier, lowering the storage container carrier from a raised state to a lowered state, extending horizontal actuators to increase the distance between longitudinal members of the storage container carrier frame in a lateral axis from a contracted state to an extended state, positioning the mobile carrier unit so that at least a portion of the longitudinal members are underneath the storage container, decreasing the distance between longitudinal members of the storage container carrier frame in a lateral axis to return to the contracted state, raising the storage container carrier; and securing the rear assembly of the storage container carrier.

The securing and unsecuring may not be required.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

Figure 6:
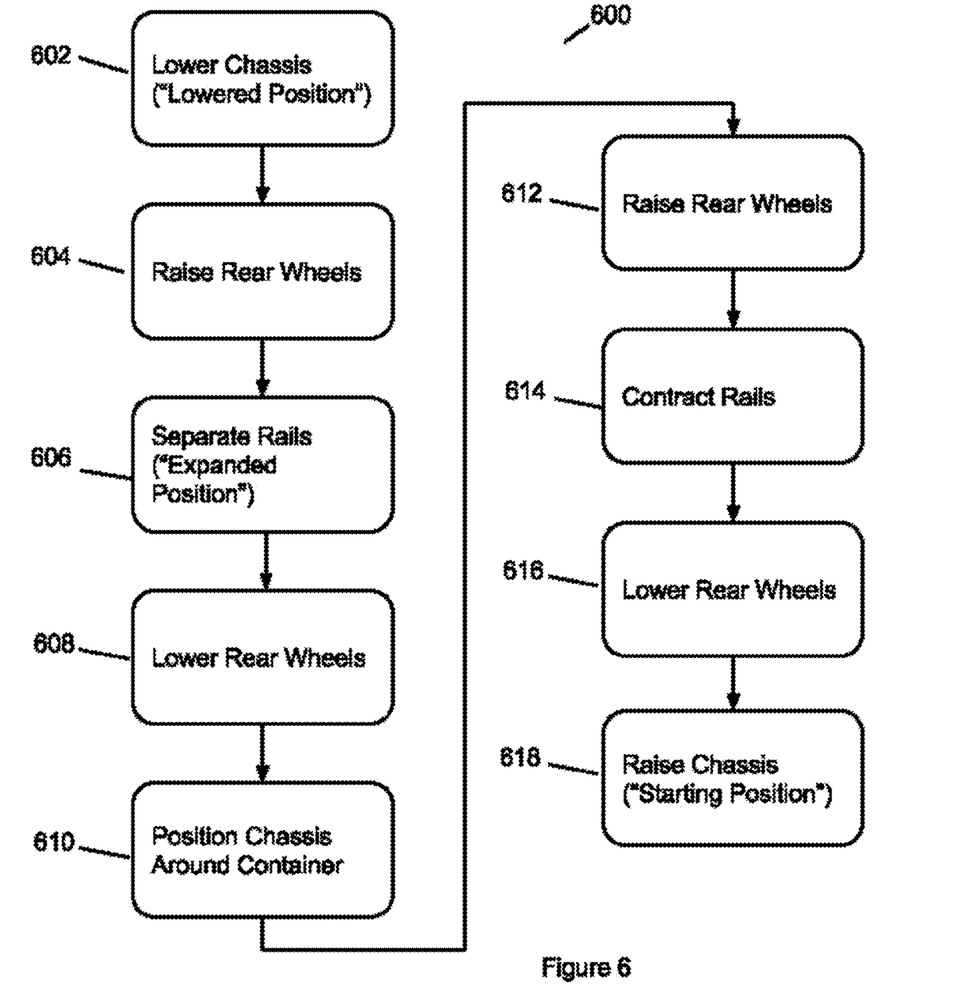
FIG. 6 is a flowchart of the method of loading a container onto the mobile carrier unit according to a non-limiting embodiment of the present invention.

FIGS. 1a-d are diagrams of the process of loading container 502 onto the mobile carrier unit ("MCU") 200, as described in more detail in FIG. 6.

MCU 200 may be capable of lifting and transporting container 502 while substantially maintaining a horizontal orientation of container 502. The operator of MCU 200 and system of controls may be similar to commercial transport systems known to those skilled in the art. Rather than tilting container 502 on an angle, MCU 200 has a plurality of vertical and horizontal actuators to maneuver a set of rails around and underneath container 502 and lift it straight up while maintaining a substantially horizontal orientation of container 502.

MCU 200 may be comprised of an operator area 202 and container carrier 204. The operator area 202 may be where a driver or operator maneuvers MCU 200 and controls the actuators for container carrier 204. Container carrier 204 may be attached to operator area 202 permanently or may be removable (such as in FIGS. 7a and 7b). Container carrier 204 carries the weight of container 502 and secures it in place.

Figures 1A, 1B:
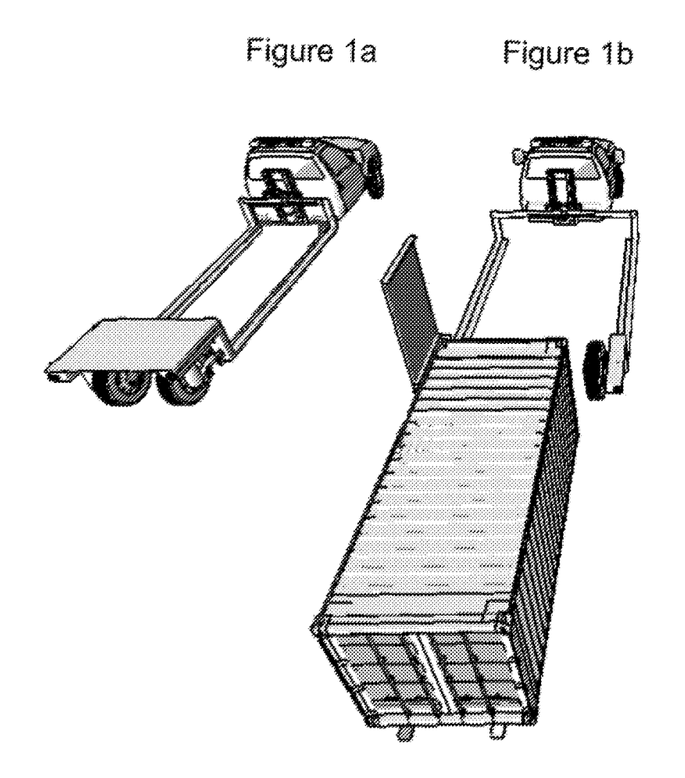
FIGS. 1a-d are diagrams of the process of loading a container onto a mobile carrier unit according to a non-limiting embodiment of the present invention.
Figure 5:
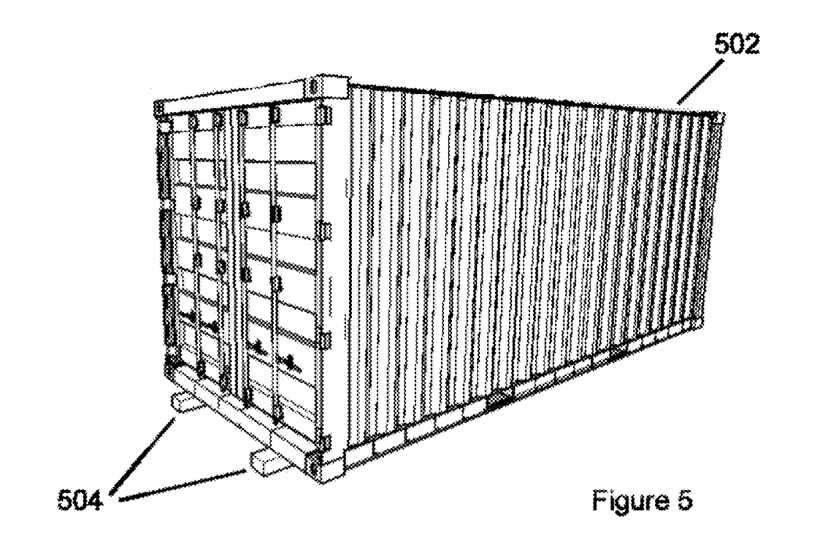
FIG. 5 is a diagram of a storage container that can be loaded onto the mobile carrier unit according to a non-limiting embodiment of the present invention.

In FIG. 1a, MCU 200 may be in a "Ready For Transport" or "Empty" state or starting position (noting that each "position" may relate to, or indicate a configuration of aspects of elements herein). In this state MCU 200 may be roadworthy, or ready to be driven, similar to a commercial transport. The rear portion of container carrier 204 may be either secured or unsecured. When secured, the distance between rails 308 and rear wheels 404 may remain fixed, held in place by cover 402 and optionally other solid structures (not shown). The rear portion may be required to be secured in order to be Ready For Transport. In order for rails 308 to move in the y-axis (ie move laterally), the rear portion of container carrier 204 may be unsecured. While in the Ready For Transport state, MCU 200 may be driven to the location of container 502. Container 502 may be raised off the ground and resting on supports 504, so that at least some of the longitudinal edges at the bottom of container 502 may be exposed (ie not have supports thereunder such that rails may be arranged below such exposed longitudinal edges), as shown in FIG. 5.

In FIG. 1b, MCU 200 may be in a "Expanded", "Reversing" and/or "Lowered" state, with the rear portion of container carrier 204 optionally being unsecured to allow container carrier 204 to expand laterally so that the distance between rear wheels 404 is greater than the width of container 502, which may allow MCU 200 to be reversed so that container 502 is between rails 308. Container carrier 204 may also be lowered closer to the ground so that at least a portion of rails 308 is lower than the bottom edges of container 502.

Figure 1C:
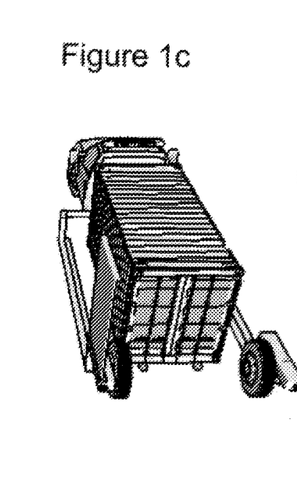

In FIG. 1c, MCU 200 may be in a "Ready to Raise", "Reversed" and/or "Enveloping" state so that i) container 502 is located between operator area 202 and cover 402 in the x-axis, and ii) container 502 is between expanded rails 308 in the y-axis (ie expand laterally), so that container carrier 204 effectively surrounds container 504. Rails 308 may then contract and move under container 502. Container carrier 204 may then raise and lift container 502.

Figure 1D:
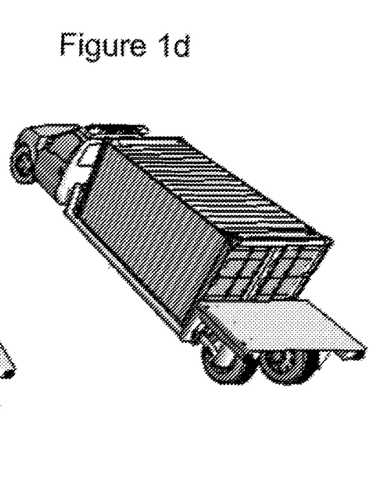

In FIG. 1d, MCU 200 is shown in a "Ready For Transport" or "Full" state with container 502 being supported by container carrier 204, and ready to be moved.

Figure 2A:
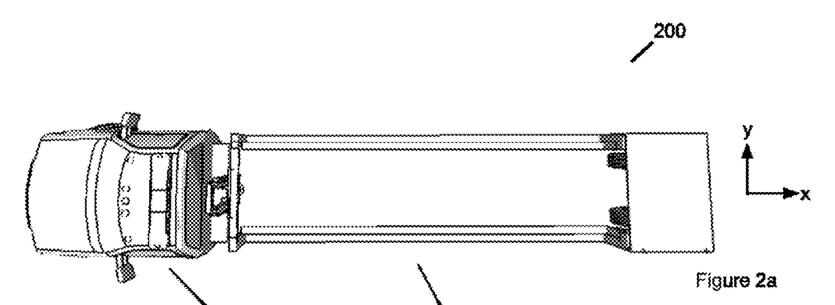
FIGS. 2a and 2b are top and side views respectively of the mobile carrier unit according to a non-limiting embodiment of the present invention.
Figure 2B:
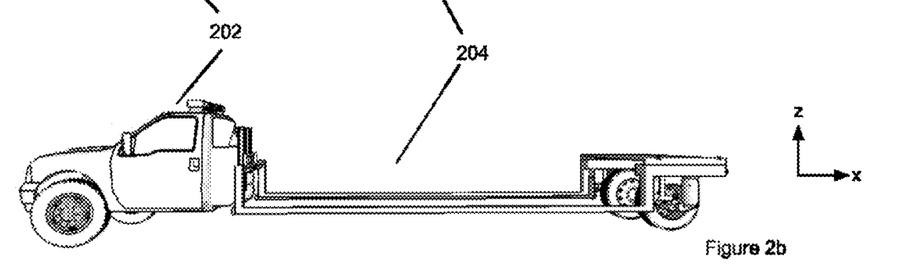

FIGS. 2a and 2b are side and top views of MCU 200 respectively. MCU 200 comprises operator area 202 and container carrier 204.

Operator area 202 may be a modified, front portion of a common civilian or commercial truck cab, for example a Ford F-Series™ pickup truck. Operator area 202 may be substantially similar to a common civilian or commercial truck except that it may be missing components that are normally present on the rear portion of the truck, such as a pickup bed, transmission, rear wheels, axels, etc. Operator area may be chosen based on dimensions and characteristics of container carrier 204 and/or container 502. Operator area 202 may be the area in which a driver may operate MCU 200, which may include maneuvering the unit into position and operating actuator unit 204.

FIG. 2a shows the MCU 200 in the x-axis and y-axis. The x-axis represents forwards and backwards movements of MCU 200 (ie in the direction of travel of MCU 200). The y-axis represents the direction of the lateral movements (expansion and contraction) of rails 308. FIG. 2b shows a side view of MCU 200 in the x-axis and z-axis. The z-axis represents the up and down direction the container carrier 204 will move in when it is raised and lowered. The x-axis in FIG. 2b is the same as FIG. 2a.

Figure 3:
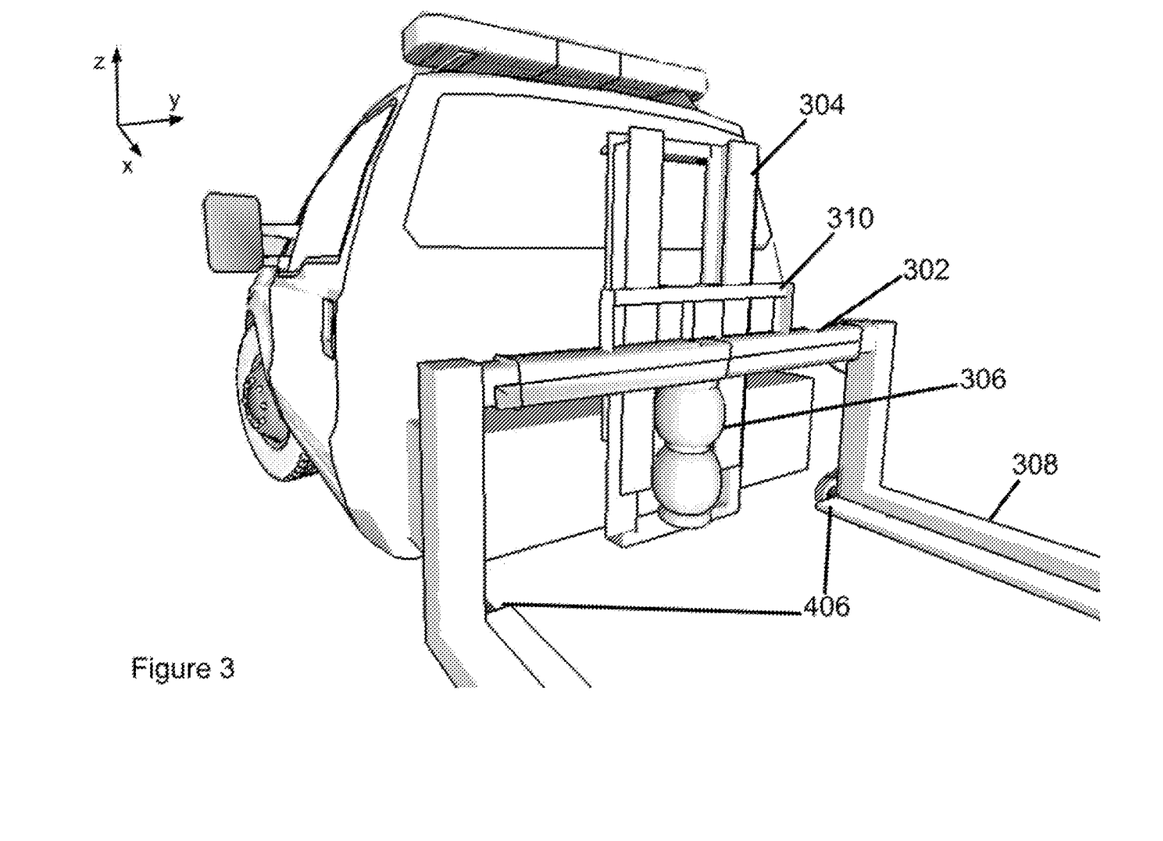
FIG. 3 is a diagram of a portion of the container carrier according to a non-limiting embodiment of the present invention.

Rails 308 may be a set or pair of two parallel, solid sections with a configuration capable of supporting the weight of container 502. For example, rails 308 may be made from high strength steel. Rails 308 may be configured or shaped so that a container may be secured in all three axes, as shown in FIGS. 2a, 2b, and 3. For example, rails 308 run parallel in the x-axis (ie longitudinally), and are capable of moving in the y-axis (laterally) and z-axis (vertically). The lowermost portion of rails 308 may have a horizontal and longitudinal surface on which container 502 rests, and a longitudinal vertical surface that may restrict motion of container 502 in the y-axis, for example an "L" shape, as shown in FIGS. 3 and 4b, for example by extending above the bottom surface of the container. In another embodiment, rails 308 may have an adjustable length in the x-axis (ie adjustable longitudinal length), that may assist in loading container 502.

FIG. 3 is a diagram of a portion of container carrier 204 showing horizontal actuators 302, mast (or mast assembly) 304, forward vertical actuators 306, rails 308, and carriage 310.

Figure 4A:
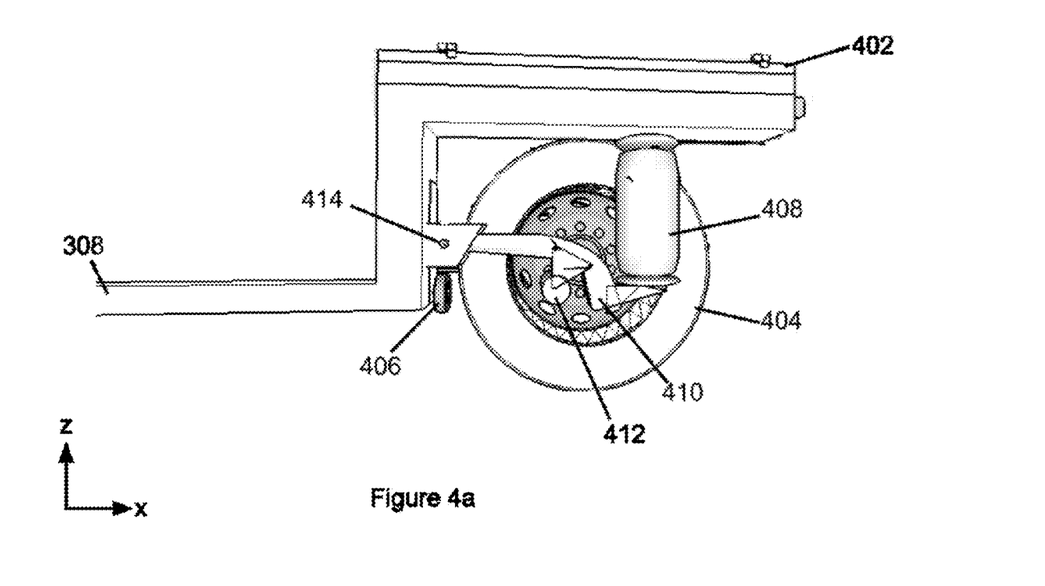
FIGS. 4a-c are side and rear views of a portion of the container carrier according to a non-limiting embodiment of the present invention.
Figure 4B:
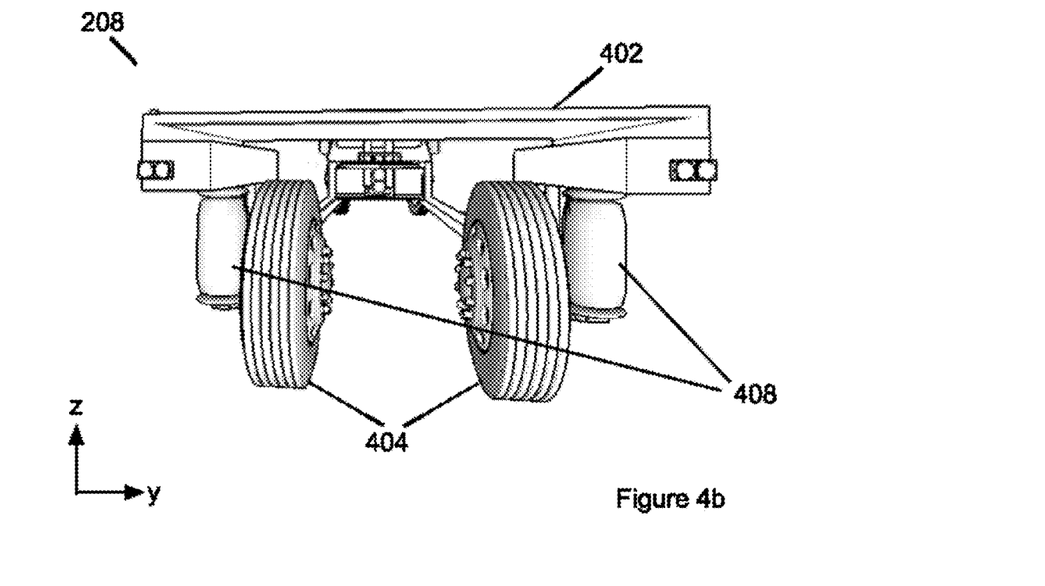
Figure 4C:
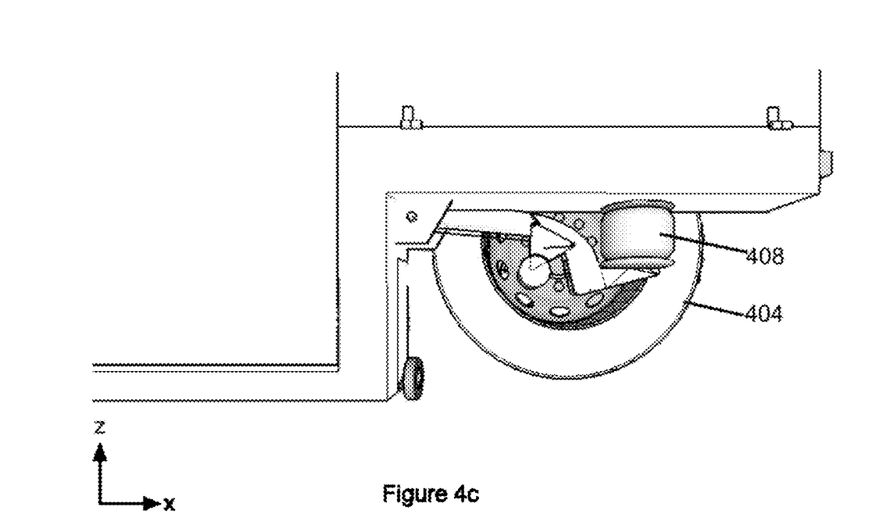

FIGS. 4a-c are side and rear views of a portion of the container carrier. The rear portion of container carrier 204 comprises cover 402, rear wheels 404, lateral wheels 406, rear vertical actuators 408, lever 410, fulcrum 412, and hinge 414.

Forward vertical actuators 306, horizontal actuators 302, and rear vertical actuators 408 ("Actuators") 306 may use hydraulics or pneumatics. Forward vertical actuators 306 and rear vertical actuators 408 may raise and lower container carrier 204 in the z-axis. Extending and contracting horizontal actuators may increase or decrease the distance between rails 308 in the y-axis. The Actuators may be powered from an engine in operator area 202 or may have one or more separate power units such as a battery powered electric motor (not shown). Controls for the Actuators may be located in the operator area 202 (not shown). In another embodiment, controls for the Actuators may be mounted on container carrier 204. Controls may include levers or buttons located in a control box (not shown). In one embodiment, each lever or button may operate a corresponding set of actuators (e.g. button 1 controls forward vertical actuators 306, button 2 controls rear vertical actuators 408, and button 3 controls horizontal actuators 302).

Some elements on the forward portion of container carrier 204 may be similar to what is found on a forklift. Mast assembly 304 may be mounted to back portion of operator area 202. As is known in the art, the mast 304 includes a pair of outer masts and inner masts, the inner masts being arranged between the outer masts. Carriage 310 is attached to the inner mast and moves up and down in the z-axis, the carriage being vertically displaceable relative to the mast and attached to the container carrier. On a forklift, a pair of forks or tines are typically connected to the carriage. In this invention the forks are replaced with horizontal actuators 302. The horizontal actuators 302 may then be raised and lowered in the z-axis.

Horizontal actuators 302 may connect rails 308 to carriage 310. Horizontal actuators 302 may be responsible for the movement of rails 308 in the y-axis. Horizontal actuators 302 may be capable of expanding so that the distance between rails 308 in the y-axis may allow container 502 to pass between rear wheels 404 ("Expanded Position"). Horizontal actuators 302 may also contract, so that the distance between rails 308 is approximately the width of container 502 and a portion of rails 308 touches the sides of container 502 ("Contracted Position"). Of course it is to be understood that any actuators herein may be capable of being partially expanded and contracted, such that different rail widths, and container carrier heights (off the ground) may be possible.

In one embodiment of the present invention, forward vertical actuators 306 may be one or more vertically stacked bladders, made from a durable, flexible material, for example rubber or plastic, capable of withstanding high pressure. The stacked bladders may be arranged so as to inflate in a vertical manner to function as a lifting device. Pumping in air may cause the bladders to expand. Releasing air may cause the bladders to contract.

In another embodiment, forward vertical actuators 306 and/or rear vertical actuators 408 be off-the-shelf commercial products, and may, for example, have specifications similar to the following:

| Product Category | Air Springs |
| --- | --- |
| Maximum Height | 13 inch (330 mm) |
| Minimum Height | 3.3 inch (83.82 mm) |
| Stroke | 9.7 inch (246 mm) |
| Maximum Diameter | 20.4 inch (518 mm) |
| Capacity | 20140 lbs (9134 kg) |
| Maximum Pressure | 120 psi (84.45 m H2O) |
| Spring Construction | Double Bellows |
| Ends and Connections | Bead Rin |

Mast 304, forward vertical actuators 306 and carriage 310 work together to raise and lower the forward portion of container carrier 204. Forward vertical actuators 306 expand and contract to move carriage 310 up and down in the z-axis. Forward vertical actuators 306 in their most expanded state may represent the highest point of container carrier 204 in the z-axis ("Raised Position"). Forward vertical actuators 306 in most contracted state may represent the lowest point of container carrier 204 in the z-axis ("Descended Position"), i.e. container carrier 204 is very close to the ground.

Cover 402 may be a flat, solid material, in a rectangular shape that connects rails 308 at the rear of container carrier 204. Cover 402 may help to secure a storage container by restricting its movement in the x-axis. Cover 402 may be capable of being removed or opened so that rails 308 may expand, for example by placing a hinge on one side and a latch on the other side and cover 402 may be raised or lowered using hydraulics. In another embodiment, cover 402 may be removed completely during the rail y-axis expansion/contraction. Cover 402 may stabilize rails 308.

Rear wheels 404 may be at least two commonly known vehicle wheels, typically a rubber tire around a metal rim, capable of supporting the weight of container carrier 204 loaded with container 502. As can be seen in at least FIGS. 1 and 2b, rear wheels 404 may be in contact with the ground and roll along the ground when carrier container 204 moves in combination with, and in the direction of travel of, operator area 202 (either backwards or forwards).

Lateral wheels 406 may be similar to rear wheels 404 but significantly smaller and oriented to rotate about the x-axis such that lateral wheels 406 are on the ground in the lowered position, off the ground in the raised position, and roll/rotate to allow the rails to move laterally. Lateral wheels 406 may be used to support container carrier 204 as rails 308 move in the y-axis direction (ie perpendicular to the direction of travel of carrier container 204 when it moves in the direction of travel of operator area 202) so that rails 308 do not come in contact with the ground. Another set of lateral wheels 406 may also be present on the front portion of the container carrier 204, as can be seen in FIG. 3.

Rear vertical actuators 408, lever 410, fulcrum 412, hinge 414, and lever support 416, together "Rear Assembly", may work together to raise and lower the both the rear portion of container carrier 204, and rear wheels 408, in the z-axis. In another embodiment, Rear Assembly may be a Hendrickson® Composite™ FX Fixed-axel suspension system or some modification thereof.

Rear vertical actuators 408 may be a set of two or more air springs typically consisting of tubular shaped air containers which are expandable and contractible axially by controlling the inlet and outlet of air under pressure. Rear vertical actuators 408 may be bellows style air bags, made from a heavy-duty reinforced rubber. (for example Hendrickson® air springs HA™/HAS™ suspension series, Primaax®, Airtek® suspension, Comfort Air® suspensions, etc) Rear vertical actuators 408 may be inflated or deflated to raise and lower the rear portion of container carrier 204 and provide suspension.

Rear vertical actuators 408 may expand and contract simultaneously with forward vertical actuators 306 to raise and lower both ends of container carrier 204 at the same time. Rear vertical actuators 408 may also move independently of forward vertical actuators 306 to control the raising and lowering of the rear portion of container carrier 204 and the height of rear wheels 408 in the z-axis.

Hinge 414 may be connected to rails 308, and may allow lever 410 to rotate about the y-axis. In another embodiment, hinge 414 may move up and down in the z-axis along the rails. Lever 410 may be a solid component and may be connected to hinge 414 at one end and rear vertical actuators 408 at the other end. Fulcrum 412 may connect rear wheels 404 with the approximate midpoint of lever 410. As rear vertical actuators 408 contract, one end of lever 410 may raise in the z-axis, which in turn may raise fulcrum 412 and rear wheels 404, as shown in FIG. 4c.

Expanding rear vertical actuators 408 may move one end or lever 410 down in the z-axis, which may in turn lower fulcrum 412 and rear wheels 404.

The most expanded position of rear vertical actuators 408 may represent container carrier 204 at its highest point off the ground. The least expanded position may represent container carrier 204 at the lowest point from the ground supported by lateral wheels 406 with rear wheels 408 raised off the ground. The Rear Assembly may have one or more pins or other locking mechanisms (not shown) that further restrict movements of the rear wheels 404 and rails 308 in multiple directions.

FIG. 5 is a diagram of a storage container 502 that can be loaded onto MCU 200. Container 502 may be a common shipping container capable of holding goods and withstanding various environmental conditions. Container 502 may rest on supports 504.

Supports 504 may be wood beams, for example 2×4 or 4×4 lengths, that raise the bottom surface of container 502 off the ground, typically a few inches. Supports 504 may run along in the x-axis.

Referring now to FIGS. 1 and 6, a method is described for loading container 502 onto MCU 200.

At 602, MCU 200 may be at a location where storage container 502 is waiting to be loaded. Container carrier 204 may be in the Raised Position, and rails 308 may be in the Contracted Position, as seen in FIG. 1a. Storage container 502 may be resting on supports 504 so that the bottom of container 502 is a few inches off the ground, as seen in FIG. 1b. By way of example, supports 504 are a plurality of 2×4 wood beams and all of the edges of container 502 are 3-4 inches off the ground. When MCU 200 is ready to be loaded, cover 402 may be unlatched and raised to a vertical orientation, or otherwise moved out of the way.

Forward vertical actuators 306 and rear vertical actuators 408 may contract as required, causing container carrier 204 to lower in the z-axis so that rails 308 are almost touching the ground.

At 604, rear vertical actuators 408 may contract further causing rear wheels 404 to rise in the z-axis off the ground to the point where container carrier 204 is in the Descended Position and supported by lateral wheels 406. In this position, a portion of rails 308 may be lower than the edges of container 502. In another embodiment, steps 602 and 604 may be combined so that forward vertical actuators 306 and rear vertical actuators 408 contract simultaneously, provided that container carrier 204 ends in the Descended Position and is supported by lateral wheels 406.

At 606, cover 402 may become unsecured to allow for rails 308 to separate, for example by unlatching one side and raising it to a vertical position. Horizontal actuators 302 may move rails 308 in the y-axis direction such that the distance between rails 308 increases. For example, in the starting position, the space between the rails may be 7 feet, 4 inches apart or between 7 and 7.5 feet. As the rails are moved apart, the space between the rails may increase to 9 feet apart, or between 8 and 9 feet, or at least wide enough so that container 502 may pass between rails 308 and rear wheels 404. Rails 308 may be in the Expanded Position, as shown in FIG. 1b.

At 608, rear vertical actuators 408 expand, causing rear wheels 404 to lower and come in contact with the ground and support container carrier 204. Forward vertical actuators 306 may also expand as required, provided that at least a portion of rails 308 (such as the bottom portion of the "L" shape) is lower than the edges of container 502.

At 610, MCU 200 moves in the x-axis (reverses) so that container 502 is positioned approximately between operator area 202 and rear wheels 408 in the x-axis and between rails 308 in the y-axis, as seen in FIG. 1c. After MCU 200 moves, container carrier 204 may surround container 502 in the x and y axes and at least a portion of rails 308 may be lower than the edges of container 502 in the z-axis. In another embodiment of the invention, container 502 may be moved and MCU 200 may be stationary.

At 612, rear vertical actuators 408 and forward vertical actuators 306 may contract as required to lower container carrier 204 in the z-axis to the Descended Position and raise rear wheels 404 off the ground so that container carrier 204 is supported by lateral wheels 406.

At 614, Horizontal actuators 302 may move rails 308 in the y-axis (ie laterally) such that rails 308 come together to the Contracted Position so that a horizontal surface of rails 308 is directly underneath container 502 and a vertical surface of rails 308 touch, or nearly touch, the sides of container 502.

At 616, cover 402 may be secured to stabilize container 502 in the x-axis, for example by closing a latch. Rear vertical actuators 408 may expand to lower wheels 404 in the z-axis so that wheels 404 come in contact with the ground and support container carrier 204.

At 618, Forward vertical actuators 306 and rear vertical actuators 408 may expand to raise container carrier 204 in the z-axis to lift and support container 502, as shown in FIG. 1d. MCU 200 is now loaded with container 502 and ready for transport. Methods to further secure container 502 for safer transport may be employed, for example with straps, ties, etc.

In another embodiment, steps 616 and 618 may be combined so that forward vertical actuators 306 and rear vertical actuators 408 expand simultaneously, so long as container carrier 204 finishes in the Raised Position supported by rear wheels 404.

Figure 7A:
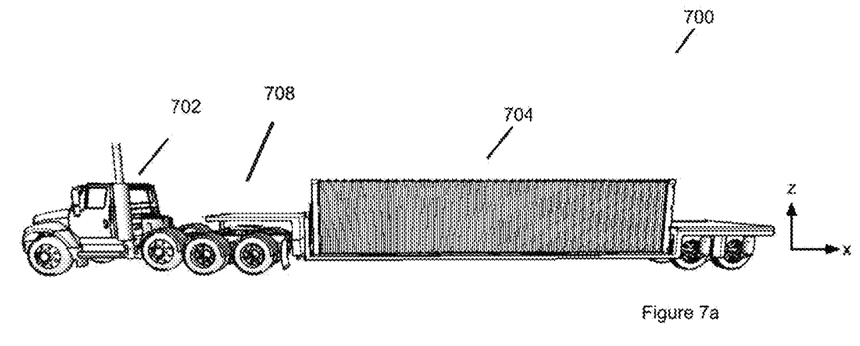
FIGS. 7a and 7b are diagrams of a standalone mobile carrier unit according to a non-limiting embodiment of the present invention.
Figure 7B:
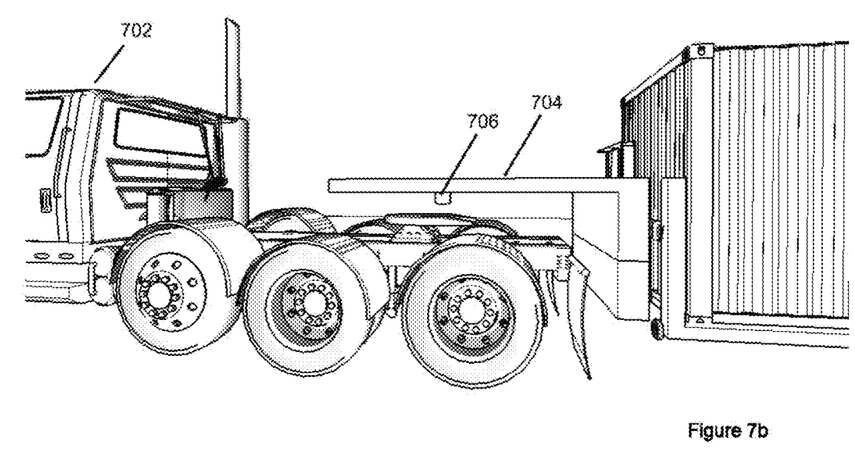

In another embodiment of the invention, container carrier 204 may be a standalone unit removably connectable to operator area 202. FIGS. 7a and 7b are diagrams of a standalone mobile carrier unit 700. In this embodiment, container carrier 704 is similar to container carrier 204, and operator area 202 may be a commercial tractor unit 702, for example a Navistar International® Durastar®.

Container carrier 704 may contain support frame 708 or other structure or adapter to allow container carrier 704 to connect to operator area 702. Mast 304 may be mounted to support frame 708. Frame 708 may be a solid structure capable of supporting a portion of the weight of container carrier 704, together with rear wheels 404 and lateral wheels 406 at various stages during the loading of container 502. Frame 708 may comprise a power unit (not shown) and control panel (not shown) for the Actuators. Frame 708 may also contain coupling 706 that connects frame 708 to operator area 702. Coupling 706 may be a standard fitting that is capable of connecting to many commercial tractor units, as is known in the art.

It is to be understood that the invention may assume various alternative configurations, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

It will be apparent to one of skill in the art that other configurations, materials etc may be used in any of the foregoing embodiments of the products, methods, and systems of this invention. It will be understood that the specification is illustrative of the present invention and that other embodiments within the spirit and scope of the invention will suggest themselves to those skilled in the art.

What is claimed is:

1. A mobile carrier unit for loading a container, the container resting on supports that raise a bottom surface of the container off the ground and the supports being positioned such that at least a portion of longitudinal edges of the bottom surface of the container do not have supports thereunder, the mobile carrier unit comprising:
    a mast, attachable to an operator area;
    a carriage, connected to and vertically displaceable relative to the mast and connected to a first horizontal actuator;
    a pair of rails, each attached to and extending longitudinally from the first horizontal actuator, and being parallel to each other, each rail comprising a horizontal surface and a rear wheel, moveably attached thereto and supporting the rail, wherein the rear wheel rolls along the ground when the mobile carrier unit moves longitudinally;
    a forward vertical actuator, disposed between the mast and the carriage, that raises and lowers the carriage,
    wherein the first horizontal actuator, connected to the carriage and each of the pair of rails, expands and contracts laterally, moving the pair of rails between a contracted position, wherein the horizontal surface of each of the pair of rails is underneath the bottom surface of the container when the container is between the two rails and an expanded position, wherein the pair of rails are wider than the container; and
    a pair of rear vertical actuators, one on each rail, each operably connected to one of the rails and its respective rear wheel, that expand and contract to raise and lower the rear wheels;
wherein the forward vertical actuator and the pair of rear vertical actuators are configured to:
    lower the pair of rails from a raised position, wherein the rear wheel on each rail is on the ground, permitting the rails to move longitudinally, to a lowered position, wherein the rear wheel on each rail of the pair of rails is off the ground and the horizontal surface of each of the pair of rails is lower than the bottom surface of the container; and raise the pair of rails from the lowered position to the raised position.

2. The system of claim 1 wherein each rail of the pair of rails is shaped to secure the container longitudinally.

3. The mobile carrier unit of claim 2 wherein the first horizontal actuator expands and contracts when the pair of rails are in the lowered position.

4. The mobile carrier unit of claim 2 wherein each of the pair of rails further comprise at least one lateral wheel that is off the ground in the raised position and on the ground in the lowered position, the lateral wheel rolling laterally along the ground when the first horizontal actuator causes the two rails to move laterally.

5. The mobile carrier unit of claim 2 wherein, in the contracted position the pair of rails are 7-7.5 feet apart and wherein, in the expanded position the pair of rails are 8-9 feet apart.

6. The mobile carrier unit of claim 2 wherein each of the pair of rails further comprise a longitudinal vertical surface and wherein, in the contracted position, each longitudinal vertical surface extends above the bottom surface of the container.

7. The mobile carrier unit of claim 6 further comprising a cover, extending laterally between the pair of rails at the longitudinal end of the mobile carrier unit and restricting longitudinal movement of the container when the container is on the pair of rails, the cover connected to a first rail of the pair of rails and removably connected to the second rail of the pair of rails.

8. The mobile carrier unit of claim 2 further comprising controls that operate the horizontal actuators and the vertical actuators and the controls are located in the operator area.

9. The mobile carrier unit of claim 2 wherein the mast is integral to the operator area and the operator area is a commercial truck cab.

10. A system for loading a container on a mobile carrier unit, the container resting on supports that raise a bottom surface of the container slightly off the ground and the supports being positioned such that at least a portion of longitudinal edges of the bottom surface of the container does not have supports thereunder, the system comprising:

the mobile carrier unit having a lowered position configuration wherein a rear wheel on each rail of a pair of rails is off the ground and a horizontal surface of each rail of the pair of rails is lower than the bottom surface of the container and the mobile carrier comprises the pair of rails, each attached to and extending longitudinally from a first horizontal actuator, and being parallel to each other, each rail of the pair of rails comprising a horizontal surface and at least one rear wheel moveably attached thereto supporting the rail when the mobile carrier unit moves longitudinally;

the mobile carrier unit having a raised position configuration wherein the at least one rear wheel on each rail is on the ground, permitting the rails to move longitudinally;

the mobile carrier unit having an expanded position configuration wherein the pair of rails are wider than the container;

the mobile carrier unit having a contracted position configuration wherein the horizontal surface of each of the pair of rails is underneath the bottom surface of the container when the container is between the pair of rails;

the mobile carrier unit further comprising:
a first horizontal actuator, operably connected to an operator area and each of the pair of rails, wherein the first horizontal actuator expands and contracts laterally, moving the pair of rails between the contracted position and the expanded position;
a forward vertical actuator, operably connected to the operator area and the pair of rails, that raises and lowers the carriage, and a pair of rear vertical actuators, one on each rail, to one of the rails and its respective rear wheel, that expand and contract to raise and lower the rear wheels, wherein the forward vertical actuator and the pair of rear vertical actuators expand and contract to move the mobile carrier between the raised position and the lowered position.

11. The system of claim 10 wherein each rail of the pair of rails is shaped to secure the container longitudinally.

12. The system of claim 11 wherein the first horizontal actuator expands and contracts when the pair of rails are in the lowered position configuration.

13. The system of claim 11 wherein each of the pair of rails further comprise at least one lateral wheel that is off the ground in the raised position configuration and on the ground in the lowered position configuration, the lateral wheel rolling laterally along the ground when the first horizontal actuator causes the pair of rails to move laterally.

14. The system of claim 11 wherein, in the contracted position configuration the pair of rails are 7-7.5 feet apart and wherein, in the expanded position the pair of rails are 8-9 feet apart.

15. The system of claim 11 wherein each of the pair of rails further comprise a longitudinal vertical surface and wherein, in the contracted position configuration, each longitudinal vertical surface extends above the bottom surface of the container.

16. The system of claim 11 further comprising a cover, extending laterally between the pair of rails at the longitudinal end of the mobile carrier unit and restricting longitudinal movement of the container when the container is on the pair of rails, the cover connected to a first rail of the pair of rails and removably connected to the second rail of the pair of rails.

17. The system of claim 11 further comprising controls that operate the horizontal actuators and the vertical actuators and the controls are located in the operator area.

18. The system of claim 11 wherein the mast is integral to the operator area and the operator area is a commercial truck cab.

* * * * *